(12) United States Patent
Gary

(10) Patent No.: US 7,039,601 B2
(45) Date of Patent: May 2, 2006

(54) METHOD AND SYSTEM FOR MONETARY GIFT REGISTRY

(76) Inventor: Dannielle Gary, 1728 Northbrook Dr., Charlotte, NC (US) 28216-3630

( * ) Notice: Subject to any disclaimer, the term of this patent is extended or adjusted under 35 U.S.C. 154(b) by 0 days.

(21) Appl. No.: 10/277,853

(22) Filed: Oct. 22, 2002

(65) Prior Publication Data

US 2004/0078283 A1    Apr. 22, 2004

(51) Int. Cl.
*G06Q 20/00*    (2006.01)

(52) U.S. Cl. .......................................... 705/14; 705/30

(58) Field of Classification Search ................. 705/26, 705/27, 14, 16, 30, 36 R
See application file for complete search history.

(56) References Cited

U.S. PATENT DOCUMENTS

| | | | |
|---|---|---|---|
| 5,329,589 A | | 7/1994 | Fraser et al. |
| 5,513,117 A | | 4/1996 | Small |
| 5,663,547 A | * | 9/1997 | Ziarno .......................... 235/380 |
| 5,665,952 A | | 9/1997 | Ziarno |
| 5,696,366 A | | 12/1997 | Ziarno |
| 5,754,981 A | * | 5/1998 | Veeneman et al. ............ 705/26 |
| 5,774,874 A | * | 6/1998 | Veeneman et al. ............ 705/27 |
| 5,898,594 A | * | 4/1999 | Leason et al. ............... 700/231 |
| 5,909,794 A | | 6/1999 | Molbak et al. |
| 5,953,710 A | | 9/1999 | Fleming |
| 5,970,474 A | * | 10/1999 | LeRoy et al. .................. 705/27 |
| 6,092,052 A | | 7/2000 | Ziarno |
| 6,173,269 B1 | | 1/2001 | Solokl et al. |
| 6,175,823 B1 | | 1/2001 | Van Dusen |
| 6,193,155 B1 | | 2/2001 | Walker et al. |
| 6,360,254 B1 | | 3/2002 | Linden et al. |
| 6,490,602 B1 | * | 12/2002 | Kraemer ...................... 715/513 |
| 6,493,742 B1 | * | 12/2002 | Holland et al. .............. 709/200 |
| 6,587,835 B1 | * | 7/2003 | Treyz et al. ................... 705/14 |
| 6,609,106 B1 | * | 8/2003 | Robertson ..................... 705/26 |
| 6,611,814 B1 | * | 8/2003 | Lee et al. ...................... 705/26 |
| 6,618,753 B1 | * | 9/2003 | Holland et al. .............. 709/217 |
| 6,669,088 B1 | * | 12/2003 | Veeneman ................... 235/383 |
| 6,853,982 B1 | * | 2/2005 | Smith et al. ................... 705/27 |
| 2001/0034609 A1 | * | 10/2001 | Dovolis .......................... 705/1 |
| 2001/0049636 A1 | * | 12/2001 | Hudda et al. ................. 705/26 |
| 2002/0042775 A1 | * | 4/2002 | Nelson et al. ................ 705/39 |
| 2002/0128934 A1 | * | 9/2002 | Shaer ........................... 705/27 |
| 2003/0074265 A1 | * | 4/2003 | Oshima ........................ 705/26 |
| 2003/0139979 A1 | * | 7/2003 | Moore .......................... 705/27 |

OTHER PUBLICATIONS

White, Ron, How Computers Work, Millennium Ed. Que Corporation, Sep. 1999.*
Derfler, Frank J. et. al. How Networks Work, Millennium Ed., Que Corporation, Jan. 2000.*

(Continued)

*Primary Examiner*—Andrew J Fischer
(74) *Attorney, Agent, or Firm*—Hunton & Williams LLP

(57) ABSTRACT

The invention provides methods and systems for collecting and transferring monetary gifts. The method includes establishing a registry for gift accounts; creating a record for a customer in the registry; storing customer information in the customer record, creating a gift account associated with the customer record; collecting deposits of gift funds from a contributor into the gift account; and transferring the gift funds from the gift account to the customer. The system includes a registry containing at least one customer record and at least one gift account identifier, at least one gift account, and a central system to maintain the registry. The system also includes at least one transaction terminal which communicates with the central system over a network.

4 Claims, 9 Drawing Sheets

OTHER PUBLICATIONS

Gralla, Preston, How the Internet Works, Millennium Ed., Que Corporation, Aug. 1999.*

Muller, Nathan J., Desktop Encyclopedia of the Internet, Artech House, Inc., 1998.*

White, Ron, How Computers Work, 6th Ed., Que Corporation, Sep., 2001.*

Derfler, Frank J. et. al. How Networks Work, 6th Ed., Que Corporation, Oct. 4, 2002.*

Gralla, Preston, How the Intenet Works, 6th Ed., Que Corporation, Sep., 2001.*

Smith, Catherine P., Retail Banking Technology, International Business Communications, Limited, 1987.*

Riley, David D., Data Abstraction and Stucture, An Introduction to Computer Science II, Boyd and Fraser Publishing Company, 1987.*

Borland's Paradox for Windows User's Guide, Borland International, Inc, 1994.*

The Bank Credit Card Business, 2nd Edition, American Bankers Association, 1996.*

Egner, Floyd E. III, The Electronic Future of Banking, Financial Sourcebooks, Inc., Napersville, IL, 1991.*

* cited by examiner

METHOD AND SYSTEM FOR MONETARY GIFT REGISTRY

BACKGROUND OF THE INVENTION

The invention relates generally to methods and systems for collecting and transferring monetary gifts.

Family and friends often wish to bestow gifts upon one another on the occurrence of an event in a person's life or on holidays. Often the person wishing to bestow the gift is perplexed about what an appropriate gift would be based on the taste and needs of the person for whom the gift is intended. To alleviate this problem, merchants organized a system in which a person or persons to whom gifts are likely to be given select items offered for sale at the merchant's place of business, which the person or persons would like to receive. Friends and family members can then ask the merchant what items were selected and may proceed to purchase items which the friend or family member already knows is desired by the gift recipient.

A problem exists that often an individual would rather have a more expensive item beyond the ability of a single friend or family member to purchase from the merchant. Further the individual potentially receiving gifts may not desire material goods or may be in greater need of money than material goods. In such cases, the potential recipient often simply asks for money. Currently, however, disadvantages arise in receiving money as a gift in that it often arrives in different forms at different times, thus requiring numerous trips to a bank to cash checks or deposit sums of cash. A need exists for a method to centralize the receipt of monetary gifts such that the recipient can receive all of his money from the same source in the same form.

The invention provides methods and systems of collecting and transferring monetary gifts, offering features not present in known methods and systems.

BRIEF SUMMARY OF THE INVENTION

In accordance with one embodiment of the invention, a method for collecting and transferring monetary gifts is disclosed. The method first includes establishing a registry. The method further includes creating a record for a customer in the registry, storing customer information in the customer record, creating a gift account for the customer, the gift account associated with the customer record, and collecting a deposit of gift funds from a contributor into the gift account. The method further includes transferring the gift funds from the gift account to the customer.

Another embodiment of the invention provides a method for collecting and transferring monetary gifts which includes establishing a registry by an entity and creating a record for a customer in the registry by a central system. The method further includes storing customer information in the customer record by the central system, creating a gift account for the customer record and associating the gift account to a customer account by the central system. The method still further includes collecting a deposit of gift funds into the gift account from a contributor through a transaction terminal and transferring the gift funds to the customer account for withdrawal by the customer.

Yet another embodiment of the invention also provides a method for collecting and transferring monetary gifts. The method includes establishing a registry by a financial institution, where the registry is an electronic database maintained by a central system, creating a record for a customer in the registry, storing customer information in the customer record, and creating a gift account for the customer, the gift account associated with the customer record and assigned a gift account identifier. The method further includes collecting a deposit of gift funds into the gift account from a contributor through a transaction terminal, where the transaction terminal is connected to the central system over a network and the transaction terminal is further adapted to receive gift account identifiers and search input from contributors. The method still further includes transferring the collected gift funds from the gift account to a customer account at the expiration of a pre-determined period of time, releasing a definite percentage of the gift funds for withdrawal by the customer from the customer account, freezing the remaining percentage of the gift funds for up to 18 years, and finally, releasing the remaining percentage of the gift funds for withdrawal by the customer from the customer account.

Yet another embodiment of the invention is a disclosed system for accomplishing the collection and transfer of monetary gifts. The system comprises a registry containing at least one customer record and at least one gift account identifier. The system further comprises at least one gift account, a central system to maintain the registry, and at least one transaction terminal, the at least one transaction terminal connected to the central system over a network. Additionally, the at least one transaction terminal is adapted to accept search input, gift account identifiers and gift funds.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Hereinafter, various embodiments of the invention will be described. As used herein, any term in the singular may be interpreted to be in the plural, and alternatively, any term in the plural may be interpreted to be in the singular.

Figure 1:
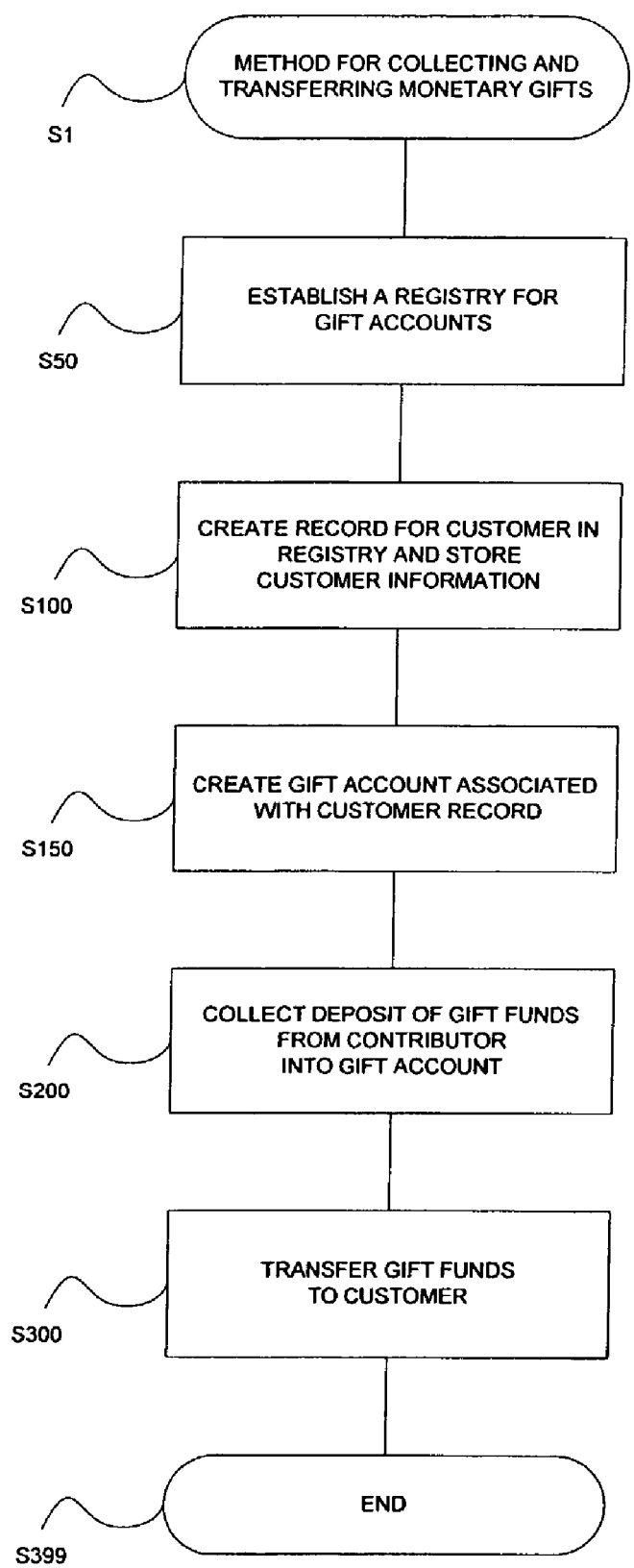
FIG. 1 is a flowchart showing a method for collecting and transferring monetary gifts in accordance with one embodiment of the invention.

In accordance with one embodiment of the invention, an illustrative flowchart showing a method for collecting and distributing monetary gifts is shown in FIG. 1 and described below.

The process begins in step S1, and passes to S50, wherein the process includes establishing a registry for gift accounts. The registry is established by an entity such as a bank or other financial institution. The registry may take the form of an electronic database, which is maintained by a central system, such as a central processing unit or mainframe at an entity such as a bank or other financial institution. The process next passes to S100, which includes creating a record for customer in registry and storing customer information. The customer may be any person or group of persons who desires to have a customer record stored in the registry. The customer record stores information received from the customer at the time the customer record is created, and includes identifying characteristics of the customer such as a customer account to which gift funds will eventually be directed. Additionally, the customer record may identify an event for which the customer record is created.

The process next passes to S150, which includes creating a gift account associated with the customer record. A gift account is opened for the customer by the entity maintaining the registry. Once the gift account is established, the process passes to step S200, wherein gift funds are collected from a contributor and deposited into a gift account. A deposit can be made at any transaction terminal in communication with the central system. Any suitable transaction terminals may be used for accepting deposits of gift funds, such as those used for financial institutions. This may include automated teller machines (ATMs), computers, telephones, and other network communication devices. In some instances, the transaction terminals may first need to be adapted for use by a contributor who does not have an account with the entity associated with the particular transaction terminal which is collecting a deposit into the gift account.

The collection of gift funds may be accomplished by accepting any method of deposit available at a particular transaction terminal. Deposits of gift funds may take the form of any one of money, check, debit card, credit card or other electronic deposit or transfer of funds.

The process next passes to step S300. In this step, the gift funds are transferred to the customer. In one embodiment of the invention, the gift funds are transferred to the customer account. The gift funds may only be deposited into the gift account for a limited period of time, after this time expires, the gift funds are transferred from the gift account to the customer account associated with the customer record. It should be appreciated that the customer may not immediately be able to withdrawal all of the gift funds from the customer account. The gift funds may be subject to various savings provisions, discussed in more detail below, which require that the gift funds remain in the customer account for a definite amount of time. Alternatively, the gift funds could be transferred directly to the customer, for example in the form of cash or a check.

Figure 2:
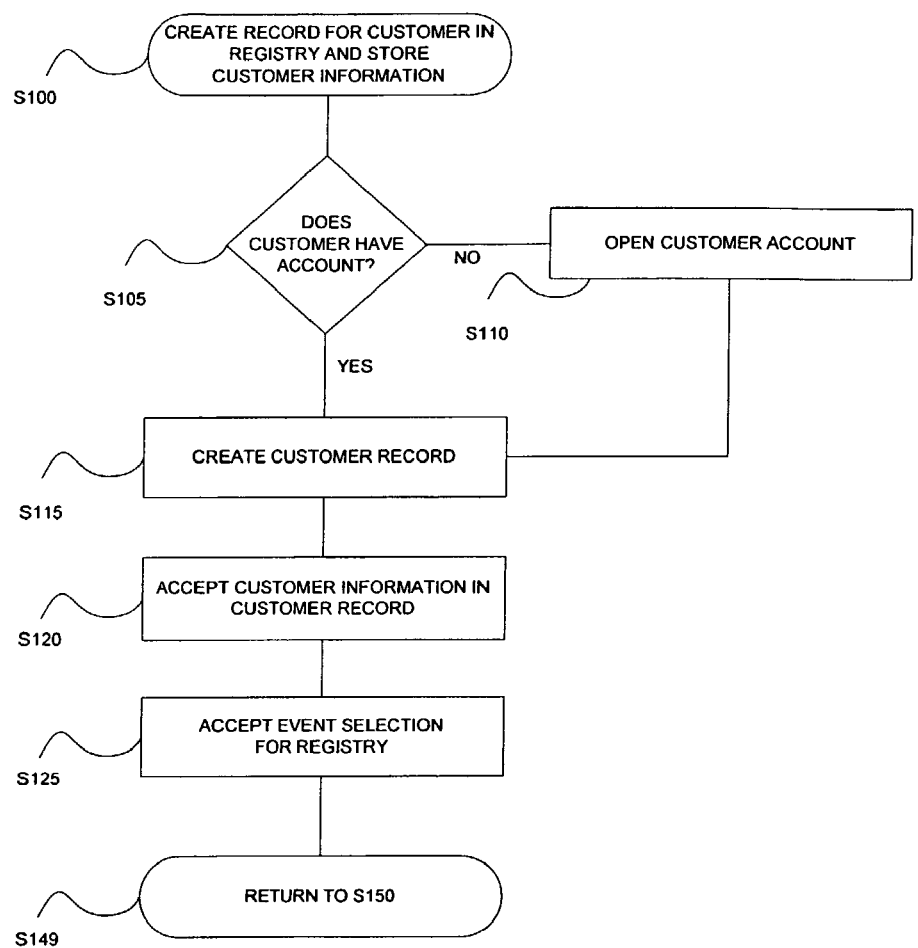
FIG. 2 is a flowchart showing the "create record for customer in registry and store customer information" step of FIG. 1 in further detail in accordance with one embodiment of the invention.

FIG. 2 is a flowchart showing the "create record for customer in registry and store customer information" step of FIG. 1 in further detail in accordance with one embodiment of the invention. Initially, it is determined in step S105 whether the customer has a customer account with the entity establishing the registry. If not, the process passes to step S110 and a customer account is opened. The customer account may be any type of financial account, such as a savings, checking, or money market account, for example. The customer account may be opened through any procedure in which the entity establishing the registry opens accounts, such as, for example, requesting the customer fill out a form. In one embodiment of the invention, the customer must have a customer account in order to transfer the gift funds. The entity establishing the registry, via transfers, may remove funds from the gift account.

Once a customer account is opened, or alternatively if a customer account was already open, a customer record is created in step S115. The customer record is created in the registry, and once created, customer information is accepted from the customer into the customer record in step S120 so that the registry contains customer information. Such information may include the customer's name, address, telephone number, and birth date. The customer information also includes a customer account number. This information may also include the customer's social security number, or any other confidential information used by the entity to establish the registry.

Figure 3:
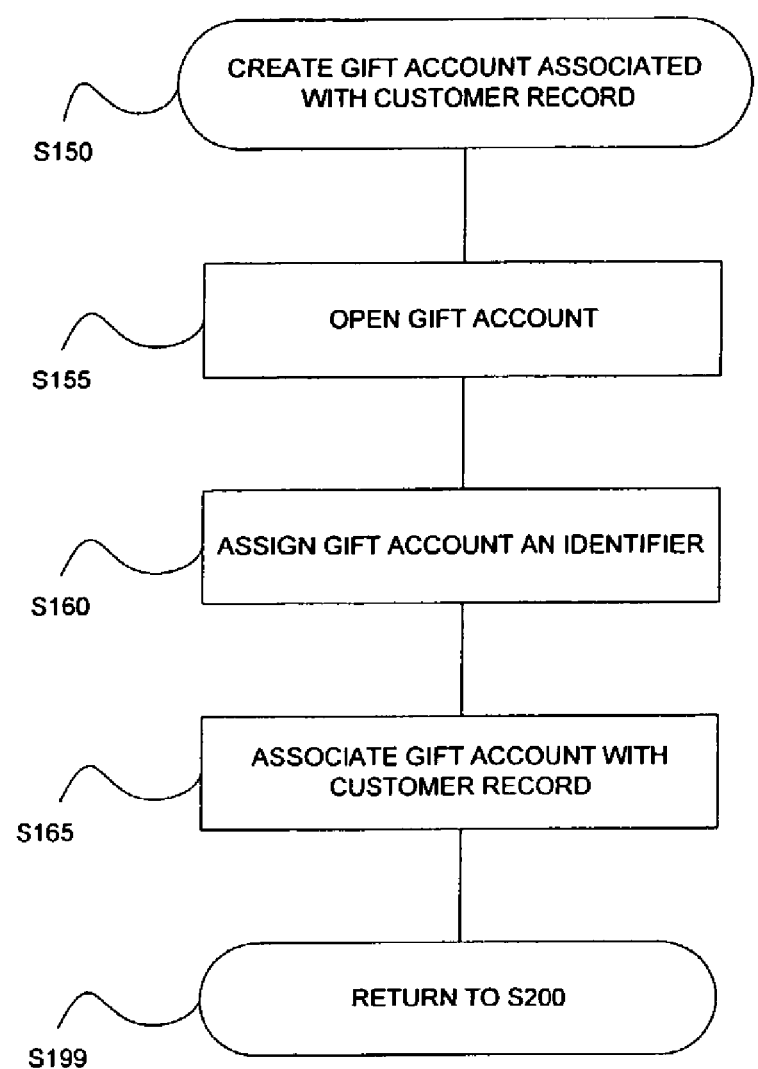
FIG. 3 is a flowchart showing the "create gift account associated with customer record" step of FIG. 1 in further detail in accordance with one embodiment of the invention.

Accepting customer information is followed by accepting an event selection for which the customer record is being created in step S125. Such events may include weddings, graduations, birthdays, bar mitzvahs, bah mitzvahs, the birth of a child, Christmas, Hanukkah, or any other special occasion. The event may influence the length of time in which the gift account remains active. This may range from 1–3 months. In one embodiment the gift account does not remain active longer than three months after the gift account is established. Once the event selection is accepted, the process returns to step S150, shown in further detail in FIG. 3.

After the customer record has been created and stored in the registry, a gift account is opened by the entity establishing the registry, as shown in step S155. The gift account is a single direction account from the perspective of a contributor: deposits may be made into the gift account but no withdrawals by the contributor are possible. Gift funds leave the gift account through transfers made by the entity establishing the registry. The newly established gift account is assigned a gift account identifier in step S160. The gift account identifier is used by a contributor wishing to make a deposit of gift funds to specify into which gift account the contributor wants the gift funds deposited. The gift account identifier may include any string of digits, letters or characters, or any combination thereof. The process next passes to step S165, wherein the gift account is associated with the customer record. The gift account identifier is paired with information in the customer record, preferably the customer account number. In one embodiment, the association of the two accounts allows the central system maintaining the registry to determine the destination of the gift funds upon leaving the gift account, while the identity of the gift account but not the destination of the gift funds, is known to the contributor.

Figure 4:
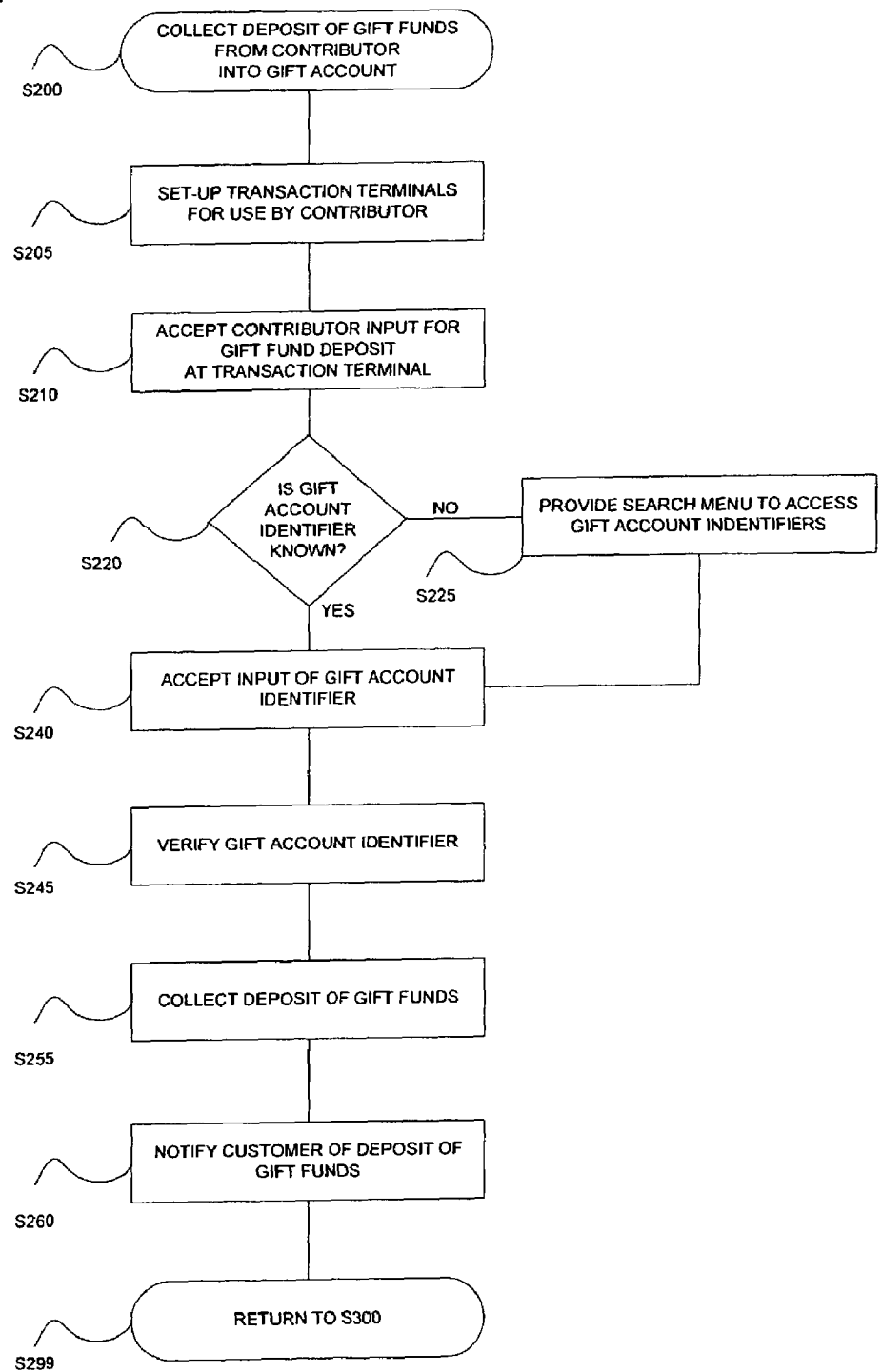
FIG. 4 is a flowchart showing the "collect deposit of gift funds from contributor into gift account" step of FIG. 1 in further detail in accordance with one embodiment of the invention.

FIG. 4 shows the "collect deposit of gift funds from contributor into gift account" step of FIG. 1 in further detail in accordance with one embodiment of the invention. As discussed above, gift funds may be received through a transaction terminal that is capable of handling traditional banking transactions. In some cases, the transaction terminals may need adaptation for use by contributors, as shown in step S205, where the contributor would not otherwise have an ability to make deposits at a particular transaction terminal, such as for example, where the contributor wishes to deposit money in a gift account at a transaction terminal associated with a bank at which the contributor does not himself have an account.

The process next passes to step S210, in which the transaction terminal accepts input from a contributor for the collection of gift funds from the contributor. The transaction terminal prompts the contributor to identify whether the gift account identifier is known for the gift account to which the contributor wishes to make a deposit of gift funds in step S220. If the contributor does not know the process passes to step S225, wherein a search menu is provided to access gift account identifiers. This step provides a way for a contributor to discover the gift account identifier if it is unknown to him. Once the gift account identifier is known, or if the gift account identifier was already known, the process passes to step S240, in which the transaction terminal accepts contributor input of the gift account identifier. The gift account identifier is then verified. Once verified, the transaction terminal collects the deposit of gift funds in step S255. The deposit of gift funds may be collected by receiving a physical deposit of money, including checks, cash, and coins. Alternatively, the deposit may be accepted by receiving contributor input of debit or credit card information, or a transfer of funds from one of the contributor's financial accounts to the gift account, including the input of any security features associated with the debit or credit card, such as a personal identification number (PIN). After the gift funds are deposited, they are received into the gift account and the transaction is complete. A receipt of the deposit may be generated by the transaction terminal for the contributor.

The process next passes to step S260, in which the customer is notified of the deposit of the gift funds into the customer's gift account. The notice may contain both the amount deposited and the identity of the contributor who made the deposit. The notice may be communicated to the customer immediately via an electronic mail message, sent from the entity administering the registry at the time the gift funds are deposited into the gift account. Additionally, a periodic statement may be sent to the customer to document all activity of the gift account over a particular period of time, such as a monthly statement, for example. Further, the activity of the gift account may also be actively monitored by the customer using account monitoring techniques, such as by telephone or the internet, for example. The process then returns to step S300, in which the gift funds are transferred to the customer.

Figure 5:
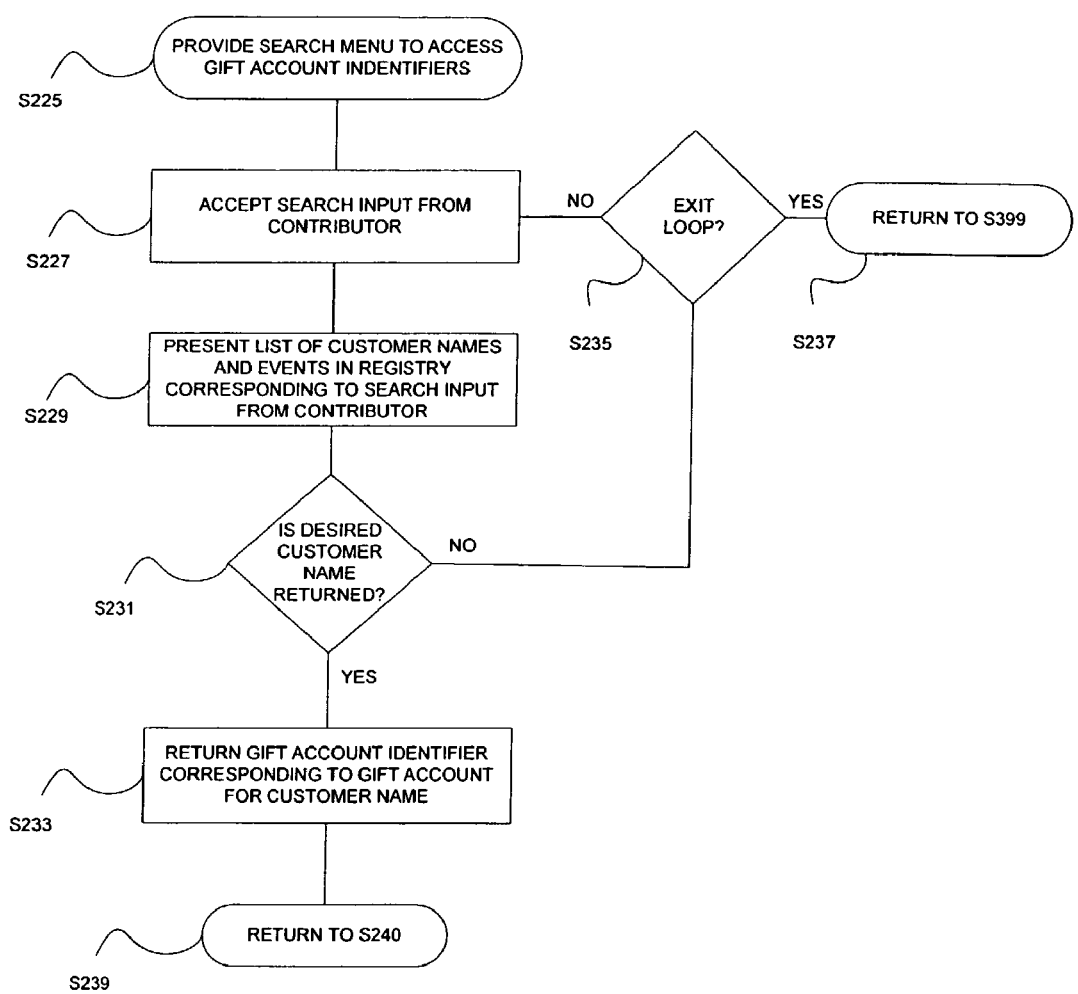
FIG. 5 is a flowchart showing the "provide search menu to access gift account identifiers" step of FIG. 4 in further detail in accordance with one embodiment of the invention.

FIG. 5 shows the "provide search menu to access gift account identifiers" step of FIG. 4 in further detail in accordance with one embodiment of the invention. In this step, a gift account identifier is returned to a contributor who does not already know the gift account identifier for the customer to whom he wishes to make a deposit of gift funds. The transaction terminal is adapted to receive contributor search input in various forms such as letters, numbers, and characters in various user interfaces. The input may be accepted through use of an input device such as a keyboard, keypad, touch-screen, voice recognition system, mouse, roller-ball, or any other equivalent means of inputting data. The transaction terminal is in network communication with the central system which searches the registry using the search input entered by the contributor. Customer records corresponding to the search input entered by the contributor are presented to the contributor in step S229. The contents of the customer record are protected by known information security and encryption technologies such that only publicly available information stored in the customer record specifically selected by the entity establishing the registry, and not private information such as the customer account number or social security number, is searched or presented to the contributor.

The transaction terminal next queries the contributor whether the search results included the customer sought by the contributor in step S231. If the customer for whom the contributor is seeking is not presented, the contributor is returned to step S235, wherein he can conduct another search, or alternatively, exit the process. If the customer whom the contributor is seeking is presented to the contributor as a result of the search, the customer is selected by the contributor through the further use of the input device and the transaction terminal returns the gift account identifier to the contributor in step S233. Once the gift account identifier is returned to the contributor, the process passes to step S240, in which the input of gift account identifier is accepted.

Figure 6:
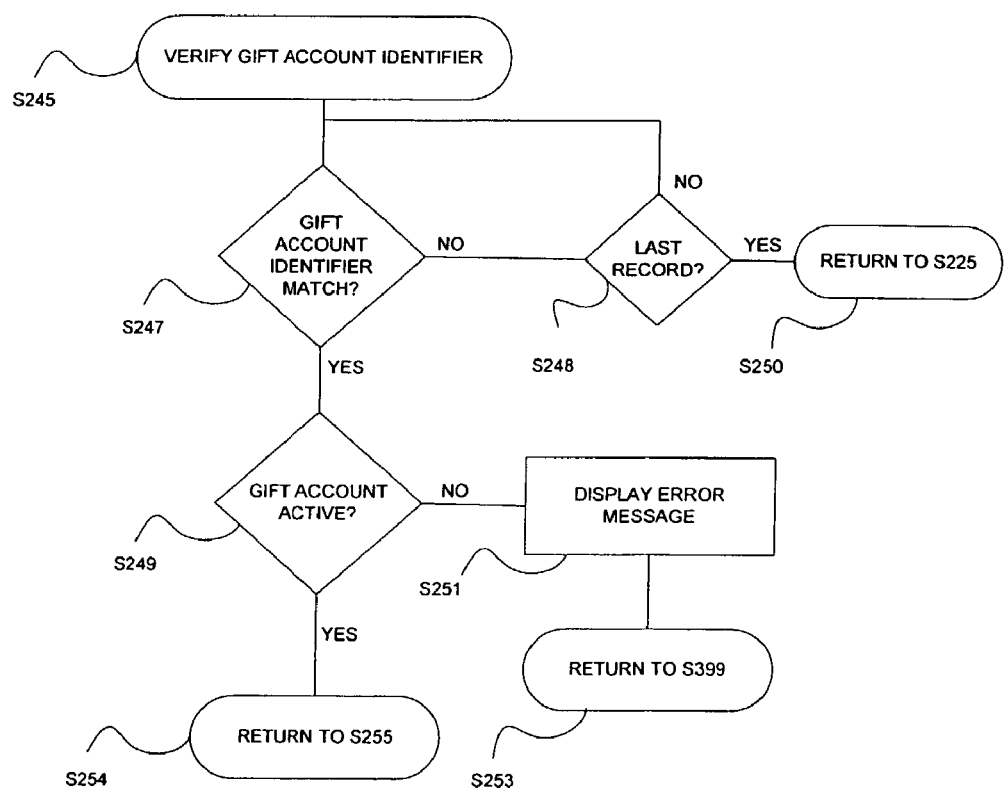
FIG. 6 is a flowchart showing the "verify gift account identifier" step of FIG. 4 in further detail in accordance with one embodiment of the invention.

FIG. 6 is a flowchart showing the "verify gift account identifier" step of FIG. 4 in further detail in accordance with one embodiment of the invention. The central system, through access to the customer record in the registry compares the gift account identifier input by the contributor to each gift account identifier stored in the registry, using conventional relational database techniques. This query continues for each gift account identifier until a match is found. If no match is found after the gift account identifier input by the contributor has been compared to all gift account identifiers in the registry, the contributor is directed to step S225.

If a match is found, a further query is made by central system whether the gift account is active in S249. If the gift account is inactive, an error message to that effect is returned to the contributor and exits the contributor from the process. If the gift account is active, the process returns to step S255.

Figure 7:
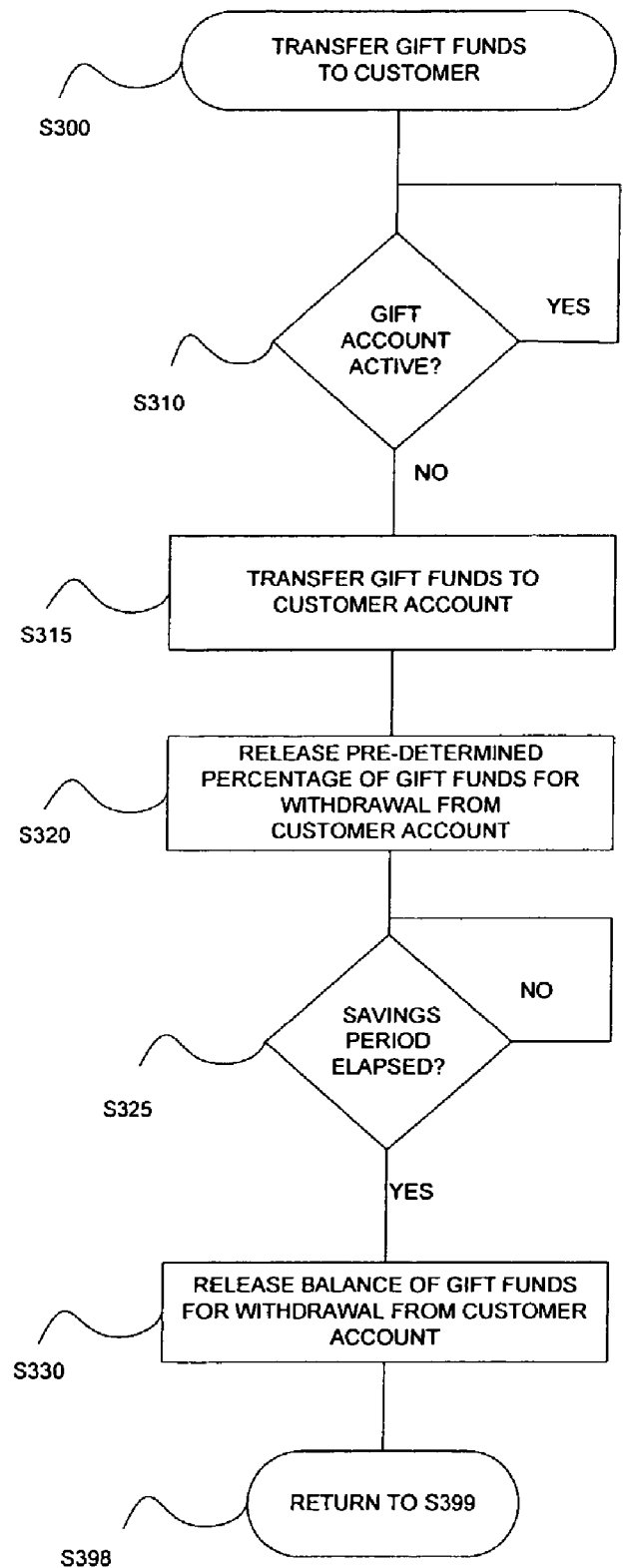
FIG. 7 is a flowchart showing the "transfer gift funds to customer" step of FIG. 1 in further detail in accordance with one embodiment of the invention.

FIG. 7 shows the "transfer gift funds to customer" step of FIG. 1 in further detail, in accordance with one embodiment of the invention. The gift funds may be retained in the gift account until the gift account becomes inactive, the length of gift account activity based on the event selection made by the customer, for example if the event is a wedding, the gift account may remain active for 3 months, while for a graduation the gift account may remain active for 2 months. The central system queries at least once daily whether the gift account is still active, as shown in step S310. Once the gift account is no longer active, the process moves to step S315 and the gift funds are transferred to the customer account by the entity establishing the registry. The gift funds are transferred from the gift account into the proper customer account through the association with the customer record. Alternatively, the gift funds could be transferred directly to the customer, for example in the form of cash or a check.

After the gifts funds are transferred to the customer account, a percentage of the gifts funds are released to the customer for withdrawal from the customer account as shown in step S320. In one embodiment, this percentage is 75% of the funds in the gift account. However, the percentage could include any amount between 1% and 100% of the total amount of gift funds. The balance of the gift funds not released for customer withdrawal remains in the customer account for a savings period. The partial release of gift funds encourages a savings program by the customer, and provides an incentive for entities to establish a registry by ensuring a definite time during which some of the gift funds are available to the entity to invest the gift funds and earn interest. The exact percentage is determined by the entity establishing the registry at a point prior to establishing the registry, and that percentage is disclosed to the customer prior to creating a customer record for the customer in the registry. It should be appreciated that the partial release of gift funds may be a condition of the entity creating a gift account for the customer and that withdrawing the whole sum of gift funds before the savings period has elapsed may result in a penalty to the customer.

The savings period may last up to six months for those customers who maintained an account with the entity establishing the registry prior to creation of the customer record, while the savings period may last up to one year for customers who had no previous accounts with the entity establishing the registry prior to creation of the customer record. Additionally, for children, the savings period may last until age 12 for customers younger than age 12, and until age 18 for customers older than age 12, but younger than age 18.

At the conclusion of the savings period, the balance of the gift funds are released to the customer for withdrawal in step S330, which may include transferring the gift funds to the customer account from the gift account if the gift funds have not already been transferred to the customer account. Alternatively, the customer may choose to withdraw the money prior to the expiration of the savings period, but subject to a monetary penalty, the amount of which is as determined by the entity establishing the registry. The process ends at this point by passing to step S399.

Figure 8:
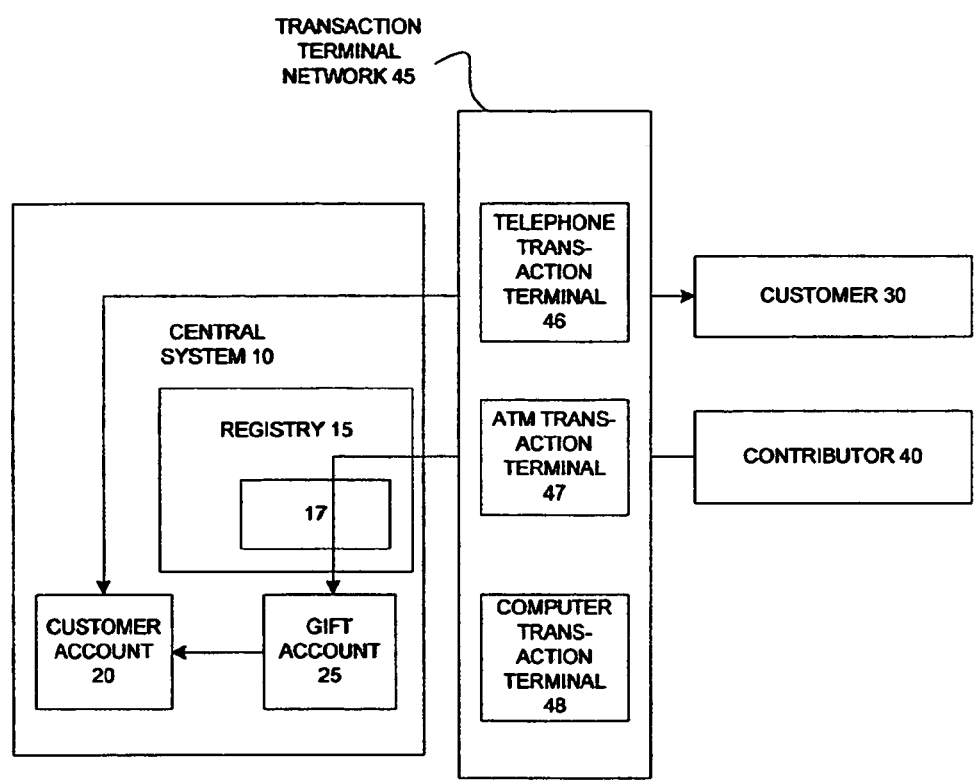
FIG. 8 is a block diagram showing an illustrative system for collecting and transferring monetary gifts featuring a single financial institution in accordance with one embodiment of the invention.

FIG. 8 shows a block diagram of an illustrative system in accordance with one embodiment of the invention. Central system 10 includes a registry 15, the registry 15 containing at least one customer record 17, and the at least one customer record 17 containing certain information about the customer and a gift account identifier. The central system 10 may be administered by a bank or other financial institution, for example. A customer 30 has a customer account 20 at central system 10, from which customer 30 can make regular deposits and withdrawals through a transaction terminal network 45. The transaction terminal network 45 may include any one or more of an ATM 46, a computer 47, a telephone 48 or other network communication device that may be used as a transaction terminal. Gift account 25 is established at the time a customer record 17 is created in registry 15 for customer 30. Contributor 40 may deposit gift funds through transaction terminal network 45 into the gift account 25. The central system directs the deposit of gift funds into the gift account 25 through information stored in the registry 15.

When gift account 25 is no longer active, contributor 40 can no longer deposit gift funds into gift account 25 and the sum of any deposits in the gift account 25 is transferred to customer account 20, where the gift funds are made available for withdrawal to customer 30 consistent with the procedure described above.

Figure 9:
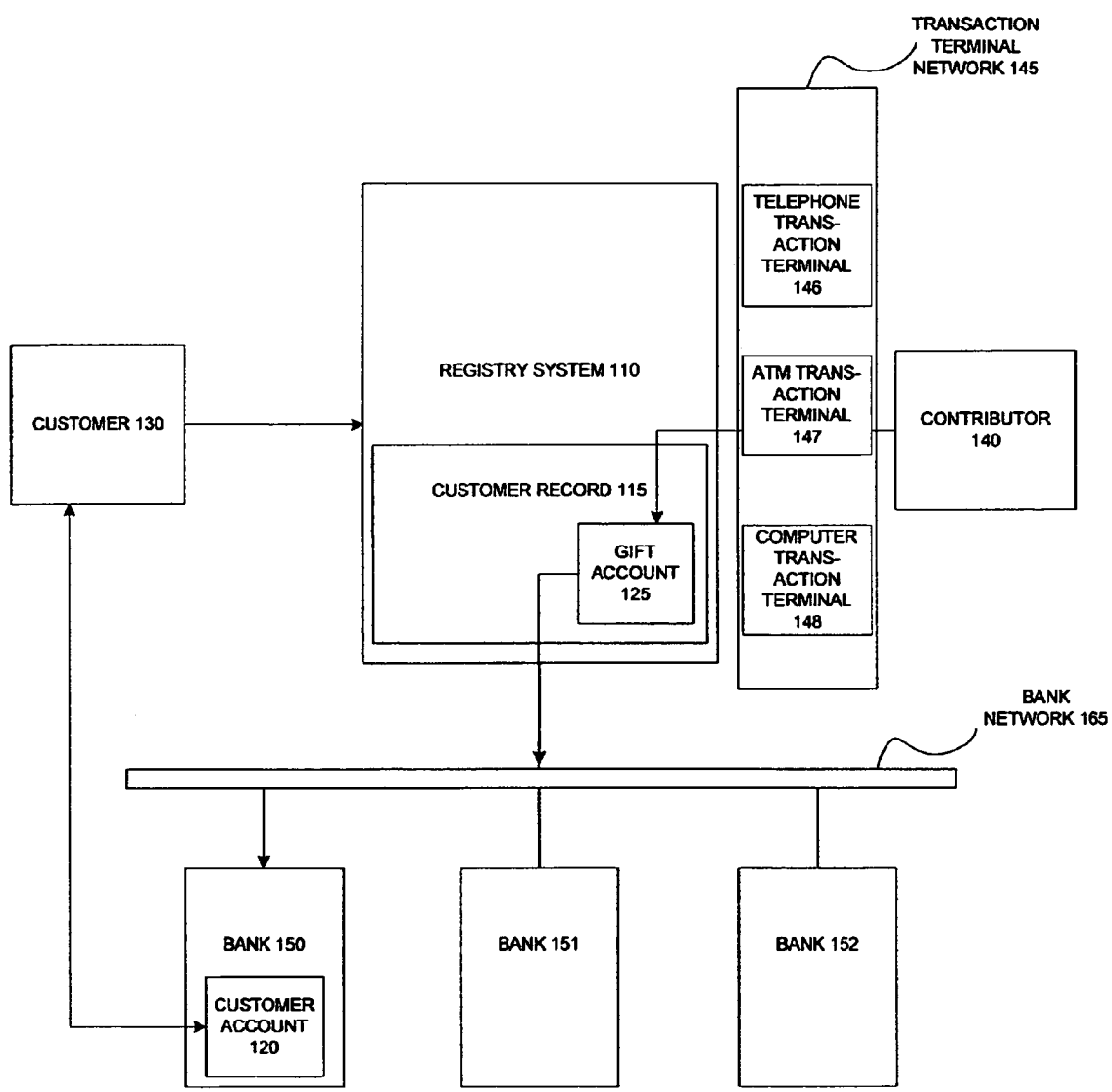
FIG. 9 is a block diagram showing an illustrative system for collecting and transferring monetary gifts featuring a registry system for transferring monetary gifts to a plurality of financial institutions in accordance with one embodiment of the invention.

FIG. 9 shows a block diagram of an illustrative system in accordance with another embodiment of the invention. Customer 130 establishes a customer record 115 with registry system 110. Registry system 110 creates a gift account 125 associated with customer record 115. Contributor 140 makes a gift deposit to gift account 125 through a transaction terminal network 145. The transaction terminal network 45 may include any one or more of an ATM 46, a computer 47, a telephone 48 or other network communication device that may be used as a transaction terminal. The registry system 110 directs the gift deposit into gift account 125 through the use of a gift account identifier unique to gift account 125 associated with customer record 115 created for customer 130. The registry system 110 is associated with a plurality of banks 150–152. Customer 130 has a customer account 120 at bank 150. After the gift account 125 becomes inactive, registry system 110 transfers the gift funds from gift account 125 to customer account 120 in bank 150 over a bank network 165 through the use of information stored in customer record 115. Customer 130 has continuous access to customer account 120 at bank 150, with the exception of customer 130's ability to withdraw the entire balance of gift funds transferred from gift account 125 to customer account 120 prior to the expiration of a savings period.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

I claim:

1. A method for collecting and transferring monetary gifts, comprising the steps of:

establishing a registry by a financial institution, the registry being an electronic database maintained by a central system;

creating a record for a customer in the registry;

storing customer information in the customer record;

creating a gift account for the customer, the gift account associated with the customer record and the gift account assigned a gift account identifier, collecting a deposit of gift funds into the gift account from a contributor through a transaction terminal, the transaction terminal in network communication with the central system, and the transaction terminal further adapted to receive gift account identifiers and search input from contributors;

transferring the collected gift funds from the gift account to a customer account at the expiration of a predetermined period of time;

releasing a pre-determined percentage of the gift funds for withdrawal by the customer from the customer account;

freezing the remaining percentage of the gift funds for a savings period of up to 18 years; and releasing the remaining percentage of the gift funds for withdrawal by the customer from the customer account.

2. The method of claim 1, wherein the gift account is associated with an event, an event identifier being stored in the customer record.

3. The method of claim 1, wherein the gift account is assigned a gift account identifier, the gift account identifier being stored in the customer record.

4. The method of claim 3, wherein the step of collecting a deposit of gift funds from a contributor into the gift account further includes:

prompting the contributor to input the gift account identifier in the transaction terminal;

accepting input of the gift account identifier from the contributor;

verifying the gift account identifier input by the contributor; and collecting the deposit of gift funds through the transaction terminal.

* * * * *